(12) United States Patent
Karlsson et al.

(10) Patent No.: US 8,341,357 B2
(45) Date of Patent: Dec. 25, 2012

(54) PRE-FETCHING FOR A SIBLING CACHE

(75) Inventors: Martin R. Karlsson, San Francisco, CA (US); Shailender Chaudhry, San Francisco, CA (US); Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 358 days.

(21) Appl. No.: 12/724,639

(22) Filed: Mar. 16, 2010

(65) Prior Publication Data

US 2011/0231612 A1    Sep. 22, 2011

(51) Int. Cl.
*G06F 12/08*    (2006.01)
(52) U.S. Cl. . 711/137; 711/119; 711/125; 711/E12.002; 711/E12.016; 711/E12.017; 711/E12.023; 712/207
(58) Field of Classification Search .................. 711/137, 711/119, 125, E12.002, E12.016, E12.017, 711/E12.023
See application file for complete search history.

(56) References Cited

U.S. PATENT DOCUMENTS

| | | | |
|---|---|---|---|
| 2010/0332755 A1* | 12/2010 | Bu et al. | 711/119 |
| 2011/0055479 A1* | 3/2011 | West et al. | 711/118 |
| 2011/0113199 A1* | 5/2011 | Tang et al. | 711/130 |

* cited by examiner

*Primary Examiner* — Yong Choe
(74) *Attorney, Agent, or Firm* — Park, Vaughan, Fleming & Dowler LLP; Mark Spiller (57) ABSTRACT

One embodiment provides a system that pre-fetches into a sibling cache. During operation, a first thread executes in a first processor core associated with a first cache, while a second thread associated with the first thread simultaneously executes in a second processor core associated with a second cache. During execution, the second thread encounters an instruction that triggers a request to a lower-level cache which is shared by the first cache and the second cache. The system responds to this request by directing a load fill which returns from the lower-level cache in response to the request to the first cache, thereby reducing cache misses for the first thread.

20 Claims, 8 Drawing Sheets

FIG. 8

# PRE-FETCHING FOR A SIBLING CACHE

BACKGROUND

1. Field

This disclosure generally relates to techniques for pre-fetching data into a cache in a computer system. More specifically, this disclosure relates to a pre-fetch mechanism that pre-fetches data into a cache different from the cache that issues the pre-fetching request.

2. Related Art

Modern processor architectures are often composed of two or more independent processor cores. Such multi-core processor architectures may include one or more caches that are shared among the multiple cores. For instance, a level one (L1) cache may be shared by multiple threads executing on different cores.

When two threads share a common cache, one thread can "help" the other thread by pre-fetching data into the shared cache. For example, in one pre-fetching technique (called "software scouting"), a separate software scout thread can speed up another ("main") thread by pre-fetching data needed by the main thread into a shared L1 cache. In such scenarios, this scout thread does not directly contribute to computing actual computational results, but instead strives to determine and send out pre-fetch requests for memory addresses that will be needed by the main thread in the near future. Hence, when the main thread attempts to access such data, the needed data has already been pre-fetched into the shared cache by the scout thread, thereby improving the performance of the main thread.

While there are a multitude of situations in which pre-fetching into a shared cache is beneficial, executing two threads in the shared context can also introduce limitations. For instance, two threads that share an L1 cache can also suffer from pipeline resource contention that can reduce the performance of both threads.

Hence, what is needed are techniques for pre-fetching cache data without the above-described problems of existing pre-fetching techniques.

SUMMARY

Some embodiments enable a first thread to pre-fetch cache data for a second thread without requiring the two threads to share a common L1 cache. For instance, a processor core associated with a first cache can trigger a pre-fetch to a second, distinct cache in a second processor core. This is defined as a "sibling pre-fetch," where a first processor core and/or cache send a request that pre-fetches data into a "sibling cache" (e.g., a second, distinct cache in a second processor core).

One embodiment provides a system that pre-fetches into a sibling cache. During operation, a first thread executes in a first processor core associated with a first cache, while a second thread associated with the first thread simultaneously executes in a second processor core associated with a second cache. During execution, the second thread encounters a program instruction that triggers a request to a lower-level cache which is shared by the first cache and the second cache. This lower-level cache responds to this request by directing a load fill which returns from the lower-level cache in response to the request to the first cache, thereby reducing cache misses for the first thread.

In some embodiments, the second thread is a scout thread for the first thread. The first thread and the scout thread execute program instructions from the same program, but the scout thread speculatively executes ahead of the first thread to pre-fetch into the first cache.

In some embodiments, the program instruction that triggers the request is a sibling pre-fetch instruction. This sibling pre-fetch instruction indicates that the resulting load fill should be directed to both the first cache and the second cache. For instance, the sibling pre-fetch instruction may include one or more fields that specify that the load fill should be directed to both the first cache and the second cache.

In some embodiments, the second cache only sends the request to the lower-level cache when the contents of a memory address associated with the sibling pre-fetch instruction are not available in the second cache. In alternative embodiments, the second cache sends the request to the lower-level cache regardless of whether the contents of the memory address are available in the second cache.

In some embodiments, a compiler inserts a sibling pre-fetch instruction into the program instructions for the second thread during compilation.

In some embodiments, the lower-level cache determines from the request that the load fill originated from the second processor core, was triggered by the second thread on behalf of the first thread, and is also targeted to the first cache. The lower-level cache then directs the load fill to both the first and the second caches.

In some embodiments, the first cache is a multi-way set associate cache. In some embodiments, the first cache always loads a load fill associated with a sibling pre-fetch into a pre-specified way of the sibling cache. In alternative embodiments, the first cache determines a cache row and a cache way for the load fill using a standard cache-replacement technique.

In some embodiments, the first processor core is associated with a first translation lookaside buffer (TLB) and the second processor core is associated with a second TLB. These two TLBs share a common lower-level TLB. While executing a sibling pre-fetch instruction, the system determines that the second TLB does not have a mapping for a memory address associated with the instruction. This TLB miss triggers a TLB request from the second TLB to the lower-level TLB. In response, the lower-level TLB directs a TLB load fill associated with the TLB request to the first TLB, thereby reducing TLB misses for the first thread.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Pre-Fetching Using a Scout Thread

In a processor, high instruction throughput typically involves rapid translation of virtual addresses and fast memory accesses. Hence, a processor may include a number of specialized hardware structures to cache frequently accessed data and to speed up address translations. In modern multi-core processors, such specialized hardware structures may include multiple levels of caches and multiple levels of translation lookaside buffers (TLBs), which cache page table translation information. In many multi-core architectures, at least one of these multiple levels of cache and/or TLB structures is shared across multiple cores.

Figure 1:
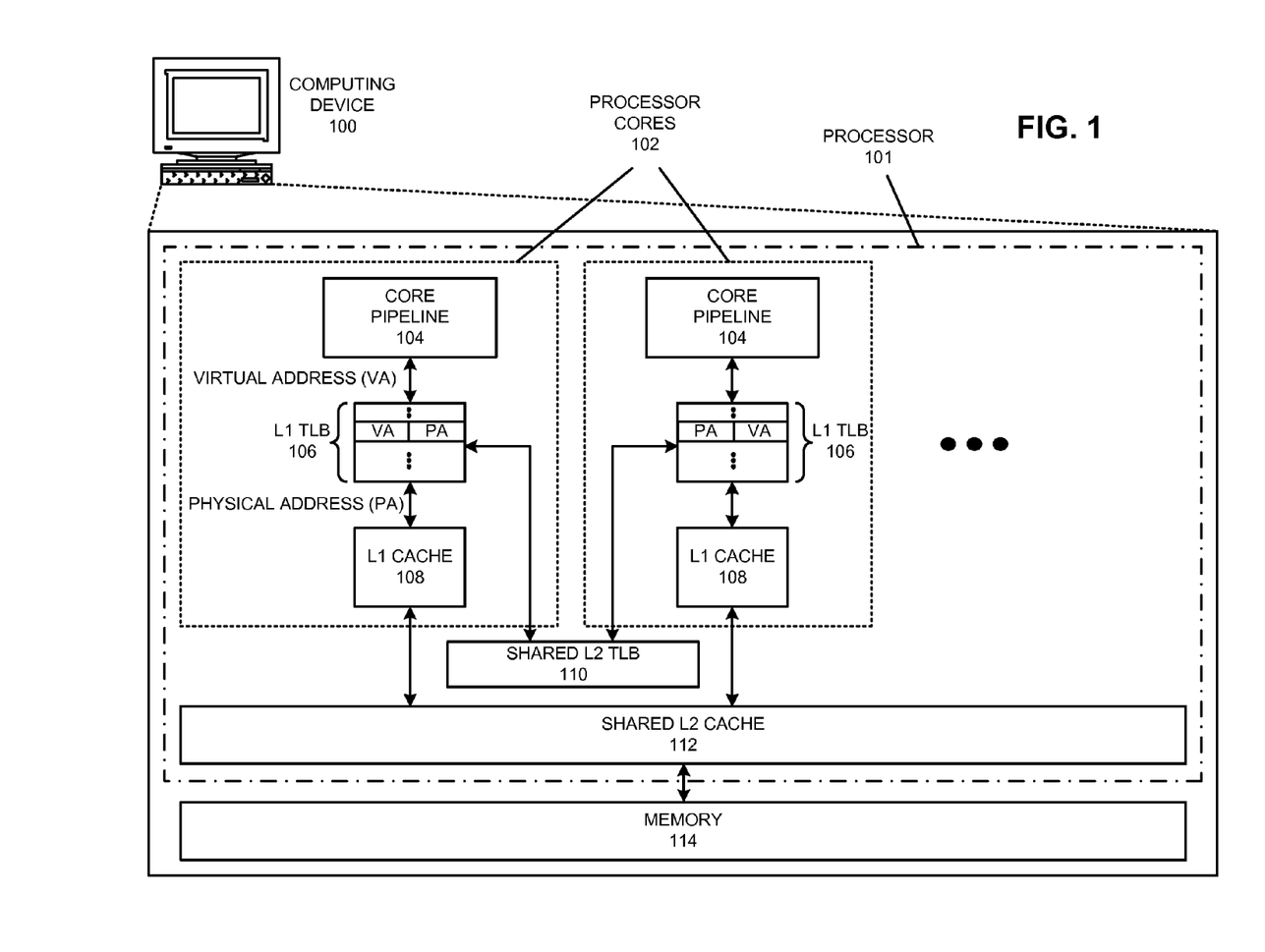
FIG. 1 illustrates an exemplary computing device that includes a set of structures for translating memory addresses and caching memory data in accordance with an embodiment.

FIG. 1 illustrates an exemplary computing device 100 that includes a set of structures for translating memory addresses and caching memory data. Computing device 100 can include a processor 101 with two or more processor cores 102, each of which includes a processor core pipeline 104, an L1 TLB 106, and an L1 cache 108. Processor cores 102 share a level-two (L2) TLB 110 and an L2 cache 112.

The instructions executed in a core pipeline 104 typically reference virtual addresses (VAs). If L1 TLB 106 contains the translation information needed for a given virtual address, that virtual address is translated into a physical address (PA), which is then sent to an L1 cache 108 along with a corresponding load or store request. In the case of a TLB miss, however, this translation information needs to be loaded into L1 TLB 106. In this case, L1 TLB 106 sends a request to L2 TLB 110, which returns the needed translation information to the requesting L1 TLB 106. Similarly, an L1 cache 108 miss results in a request to the shared L2 cache 112, which returns the needed cache data to the requesting L1 cache 108. In this case, a miss in shared L2 cache 112 results in a request to main memory 114. Note that the memory hierarchy illustrated in FIG. 1 is exemplary, and different implementations may have additional cache and TLB levels as well as different granularities of sharing for cache and TLB structures.

In some processor architectures, an L1 cache and L1 TLB are shared by multiple threads and/or cores. In such architectures, software scouting can exploit these shared caches and TLBs to improve performance. For example, a separate software scout thread can speed up another ("main") thread by pre-fetching data needed by the main thread into the shared L1 cache. In such architectures, this scout thread does not directly contribute to computing actual results, but instead strives to determine and send out pre-fetch requests for memory addresses that will be needed by the main thread in the near future. Hence, when the main thread attempts to access such data, the needed data has already been pre-fetched into the shared cache by the scout thread, thereby improving the performance of the main thread. Note that such techniques may consume substantial additional resources (e.g., using twice the hardware resources to get a small performance gain), but may be beneficial in some situations. For instance, such techniques can be used to improve performance for a critical main task and/or when the additional hardware being used to run the scout thread would otherwise be idle.

To achieve the desired pre-fetching, a scout thread will typically need to execute ahead of the main thread. Hence, while the scout thread and the main thread both execute instructions from the same program, the scout thread needs to skip a subset of the program instructions to get sufficiently ahead of the main thread to provide beneficial pre-fetching. However, at the same time, to perform accurate pre-fetching, the scout thread needs to execute the requisite program instructions needed to correctly handle any data and control dependencies (e.g., the scout thread would need to take the same branches as the main thread and perform any memory accesses associated with computing memory addresses). For instance, if both threads start at the same time, and reach a large iterative loop that does not include any data or control dependencies, the main thread may iterate through the entire loop (to calculate correct results), while the scout thread may jump ahead (skipping loop iterations) to get ahead of the main thread and be able to pre-fetch for the main thread. In another example, the scout thread may be compiled to jump over function calls and/or skip any memory accesses that are not required to compute subsequent memory address.

In some embodiments, the set of program instructions to be executed by the scout thread is determined during compilation. In these embodiments, a compiler (including a static compiler, just-in-time compiler, and/or runtime environment) can analyze program operations and interactions to determine which program instructions are likely to be extraneous for the scout. Furthermore, the compiler can insert explicit pre-fetch instructions into the scout thread's instruction stream in the vicinity of memory accesses to load the specified memory addresses into the shared cache. Alternatively, if no control or data dependencies exist for a memory access, the compiler may in some situations replace a load or store instruction with a pre-fetch instruction. Placing pre-fetch instructions in the vicinity of memory accesses ensures that the shared cache and TLB will be pre-loaded with data that will be needed by the main thread.

The above-described techniques describe using a software scout thread to pre-fetch data for a main thread in situations where the scout thread and the main thread share the same L1 cache (e.g., when both threads execute on the same core, or on two different cores that share the same L1 cache). However, there are drawbacks to such an arrangement. For instance, having the scout thread and main thread execute on the same core or on separate cores that share an L1 cache can cause pipeline resource contention that can reduce the performance of the main thread. Also, for many workloads, a private data cache has better performance than a data cache that is shared between cores.

Executing a scout thread on a different core with a separate L1 cache would reduce contention with the main thread for pipeline resources. Unfortunately, existing pre-fetching instructions and techniques do not support pre-fetching between two cores with separate caches. In existing implementations, pre-loading data into another processor core's cache involves interrupting the other processor, switching in the software thread that will perform the pre-fetching, and then executing the pre-fetching thread in place. The overhead of such an approach is likely to be larger than the performance benefit of a warmed cache. Hence, embodiments of the present invention involve techniques that allow a scout thread to efficiently pre-fetch data to an L1 cache which is not accessed by the scout thread.

Pre-Fetching for a Sibling Cache

Embodiments of the present invention involve techniques and infrastructure that enable a thread to pre-fetch data into an unshared "sibling cache." For instance, the system can identify the cores and caches that are associated with two associated threads at initialization time. Subsequently, sibling pre-fetch requests initiated by one of the threads are sent to a lower-level cache that is shared by both threads. This shared lower-level cache directs the resulting load fill to both the requesting thread's cache (also referred to as the "scout cache") as well as the other (sibling) thread's cache (i.e., the sibling cache, also sometimes referred to as the "main cache" if in the pre-fetches occur in the context of software scouting).

Figure 2:
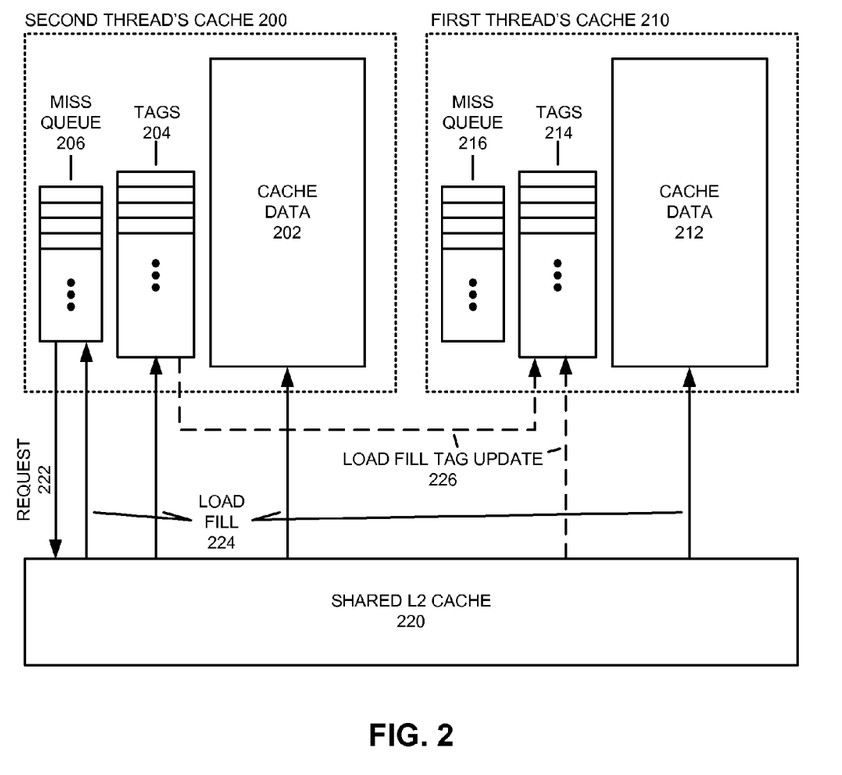
FIG. 2 illustrates the process of pre-fetching data into a sibling cache in an exemplary processor architecture that includes two or more cores with separate first-level data caches and a shared L2 data cache in accordance with an embodiment.

FIG. 2 illustrates the process of pre-fetching data into a sibling cache in an exemplary processor architecture that includes two or more cores with separate first-level data caches (200, 210) and a shared L2 data cache 220. L1 caches 200 and 210 both include a set of tags (204, 214) that indicate currently loaded cache data (202, 212), as well as miss queues (206, 216) that track requests that have been issued to shared L2 cache 220. During operation, a given cache (200 or 210) receives a memory address, and then compares a portion of the memory address to the set of tags (204 or 214, respectively) to determine whether the desired cache line is available in the cache. If the desired cache line is available, the corresponding cache location is accessed (e.g., either read or written). If the cache line is not available, a request for the cache line is sent to shared L2 cache 220 and tracked in the L1 cache's miss queue (206 or 216, respectively) until request is filled.

In FIG. 2, cache 210 stores data for a first thread, and cache 200 stores data for a second thread that performs pre-fetches for the first thread. During execution, the second thread executes a sibling pre-fetch instruction (described in more detail below). This instruction triggers cache 200 to send a request 222 to shared L2 cache 220. In response, shared L2 cache 220 directs a load fill 224 to both cache 200 and cache 210. Components in cache 200 use load fill 224 to update cache data 202 with the newly received cache line(s), to update the set of currently loaded tags 204, and to remove the now-completed request from miss queue 206. Cache 210 determines from load fill 224 that load fill 224 was directed to cache 210 as the result of a pre-fetch, and hence updates cache data 212. Note that miss queue 216 never included information related to request 222, and hence does not need to be updated.

Also note that a range of techniques may be used to update 226 tags 214 in cache 210 to reflect the information from load fill 224. For instance, an L1 cache may be able to directly update the tags of another L1 cache. In such architectures, the requesting cache's miss queue 206 and/or tag 204 structures may send a tag update 226 to the sibling cache 210. Upon receiving update 226, sibling cache 210 updates tags 214 and marks the associated cache line as being valid. Alternatively, in some other embodiments, sibling cache 210 may instead directly update and validate tags 214 using information from load fill 224 while simultaneously loading cache data from load fill 224.

In some embodiments, the second thread is a software scout thread that executes ahead of an associated main thread to perform software scouting (as described above). Note, however, that while sibling pre-fetches can be used to improve the performance of software scouting (as described previously and in subsequent examples), sibling pre-fetches are in no way limited to software scouting, and can benefit a range of other applications where one thread in some way accelerates or communicates with ("scouts" for) another thread (e.g., by somehow executing ahead of, or producing data for, the other thread). For instance, in some embodiments, sibling pre-fetches can be used to speed up multi-threaded applications where one thread produces data and another thread "consumes" (e.g., performs further operations upon) the produced data. After producing a set of data, the producer thread sends a sibling pre-fetch request that pre-fetches that data into the consumer's cache, thereby allowing the consumer thread to match the pace of the producer thread (instead of being delayed by data misses). In another example, a scheduler seeking to move a thread from a first core to a second core can "setup" such a transfer by using sibling pre-fetches to preload the cache on the destination core with data that will be needed by the transferred thread, thereby speeding up thread migration. Hence, while some of the subsequent examples describe aspects of sibling pre-fetches in more detail in the context of software scouting, these examples in no way indicate that the described techniques are limited to software scouting.

In some embodiments, fill packets are broadcast to all first-level caches using a shared set of lines. In such architectures, the receiving caches may check a core and/or cache identifier in the load fill and/or identifying information stored in a miss queue to determine whether to load the corresponding data. In such embodiments, a lower-level cache sending the load fill packet may be configured to include additional bits and/or fields that: (1) indicate that the load fill was requested by a pre-fetching thread; and/or (2) identify the core and/or cache identifier of a second (or additional) cache(s) that should also receive the load fill. Caches may be configured to check multiple fields in load fills to determine whether they should load the data from a received load fill. In alternative embodiments without shared wires, the shared lower-level cache can send load fill packets directly to the requesting cache and any identified sibling cache(s).

Figure 3:
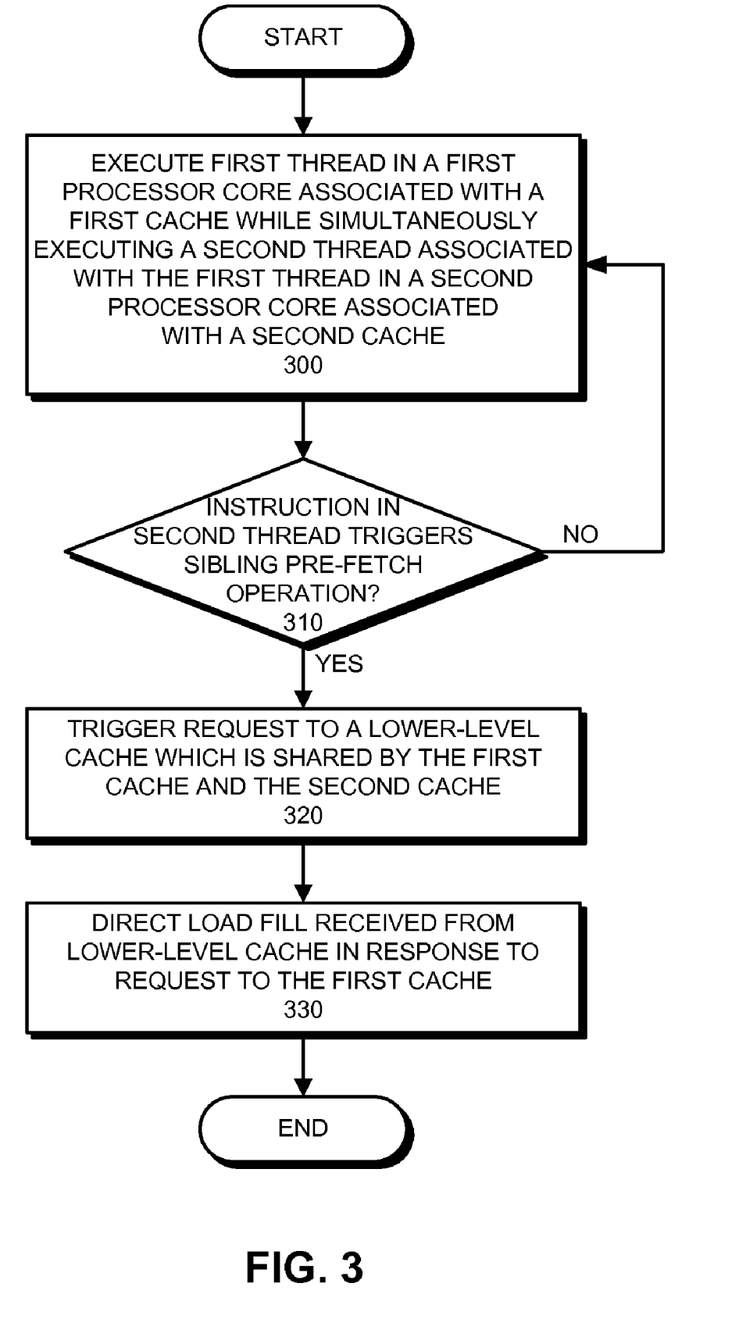
FIG. 3 presents a flow chart that illustrates the process of pre-fetching into a sibling cache in accordance with an embodiment.

FIG. 3 presents a flow chart that illustrates the process of pre-fetching into a sibling cache. During operation, a first thread executes in a first processor core associated with a first cache, while a second thread associated with the first thread simultaneously executes in a second processor core associated with a second cache (operation 300). During such execution, the second thread may execute an instruction that triggers a sibling pre-fetch operation (operation 310). Such an instruction triggers a request to a lower-level cache which is shared by the first cache and the second cache (operation 320). The lower-level cache responds to this request by directing a load fill to the first cache (operation 330), thereby reducing cache misses for the first thread.

Sibling Pre-Fetch Instructions and Cache Fill Opcodes

In some embodiments, a pre-fetching thread executes a sibling pre-fetch instruction to signal that a specified memory address (and/or memory block) should be pre-fetched into a sibling cache. A compiler can insert such sibling pre-fetch instructions into the program instructions during compilation and/or at runtime, as described previously. When the pre-fetching thread begins to execute, the processor and/or operating system know the cores and caches that are associated with both the pre-fetching thread and its sibling thread. When a sibling pre-fetch instruction is subsequently executed by the pre-fetching thread, the system determines whether a sibling pre-fetch should occur, and if so, sends a corresponding request to a lower-level cache.

In some embodiments, each processor core has a predetermined sibling, and the runtime system ensures that the pre-fetching thread executes on the predetermined sibling to the core executing the sibling thread. In other embodiments, the target sibling core can be identified using information embedded in an instruction field or in a processor register. In some embodiments, sibling pre-fetch information may also be embedded into special load and/or store instructions, thereby combining two pre-fetch and memory access instructions into a single instruction that performs both operations.

Figure 4A:
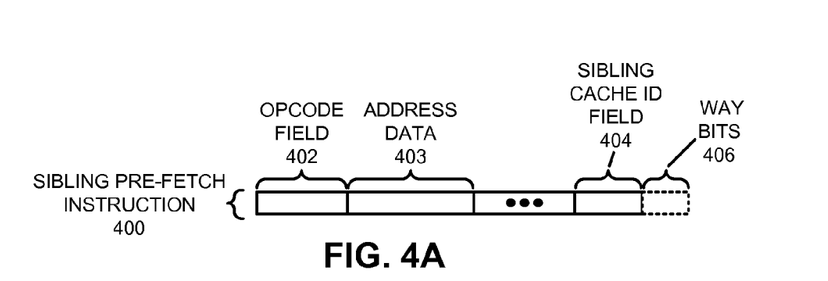
FIG. 4A illustrates an exemplary sibling pre-fetch instruction that facilitates loading data in a data cache different from that of the requesting core in accordance with an embodiment.

FIG. 4A illustrates an exemplary sibling pre-fetch instruction 400 that facilitates allocating data in a data cache different from that of the requesting core. Sibling pre-fetch instruction 400 includes an opcode field 402 that identifies the instruction, address data 403 for a memory address (or memory block) to be pre-fetched (e.g., actual bits for the memory address, or bits that identify a register containing the memory address), and a field 404 that identifies a sibling cache ID (or, in some architectures, a sibling core ID). In some embodiments, sibling pre-fetch instruction 400 also includes one or more way bits 406 that indicate that pre-fetched data should be loaded into a specified way of the sibling cache (described in more detail in following sections).

In some embodiments, determining whether to send a sibling pre-fetch request depends on whether the requesting cache (e.g., the cache that initiates the pre-fetch requests) hits for the memory address associated with the pre-fetch. For instance, in some embodiments sibling pre-fetches may be filtered by hits in the requesting cache. Such a policy may be based on that notion that, even though the contents of the requesting cache and the sibling cache are unlikely to contain exactly the same data (e.g., the sibling thread may perform additional data operations that are skipped by the pre-fetching thread, and thus data may be preserved in the sibling cache longer than in the requesting cache), data in the requesting cache is likely to already be loaded in the sibling cache. Filtering out sibling pre-fetches in this manner may reduce pressure on lower levels of the cache and memory hierarchy. However, filtering a sibling pre-fetch because of a hit in the requesting cache may result in a miss in the sibling cache, thereby reducing the effectiveness of the pre-fetching efforts.

In some alternative embodiments, every executed sibling pre-fetch triggers a pre-fetch request to the shared lower-level cache, whether or not the associated memory address hits in the requesting cache. For instance, for the previously described producer/consumer-style application, where one thread produces data and another thread "consumes" the produced data, the sibling pre-fetch would hit in the producer's cache (e.g., the requesting cache), but should not be filtered. In other instances, the compiler may be able to predict likely cache behavior for the requesting and sibling caches, and hence be able to insert a precise set of sibling pre-fetch instructions that cause targeted and beneficial sibling pre-fetches, which do not need to be filtered.

In some embodiments, the pre-fetch system may be adjusted on-the-fly to change the filtering of sibling pre-fetch requests based on program or system settings and/or behavior.

Note that additional pre-fetch requests for memory addresses that are already covered by pending sibling requests tracked in the requesting cache's miss queue typically do not need to be sent, because they will already be filled by the pending sibling request. Note also that in both of the above-mentioned embodiments, the sibling cache may need to ensure that load fills do not result in duplicate entries. For instance, the sibling cache may compare the tags for load fills against its stored tags to ensure that the load fill contains new cache data instead of duplicates. Alternatively, in some processor architectures where the lower-level shared cache tracks the contents of the level-one caches (e.g., using a reverse directory; exemplary embodiments of a reverse directory are described in U.S. Pat. No. 6,684,297, entitled "Reverse Directory for Facilitating Accesses Involving a Lower-Level Cache," by inventors Shailender Chaudhry and Marc Tremblay), the lower-level shared cache can detect and drop sibling pre-fetch requests for data that is already loaded in the sibling cache.

In some embodiments, sibling pre-fetch information is incorporated into a cache request and/or a load fill. For instance, when executing a sibling pre-fetch instruction, the request sent by the requesting cache to an L2 cache may include a new opcode that indicates to the L2 cache that the resulting load fill has been requested by a requesting thread for both the requesting cache as well as a second (sibling) cache. This request may include both a requesting cache ID (for the requesting thread) and the sibling cache ID for the sibling thread. The lower-level cache uses this information to direct the resulting load fill, and may include both cache IDs in the resulting load fill packet to ensure that both caches receive and load the corresponding cache data.

Figure 4B:
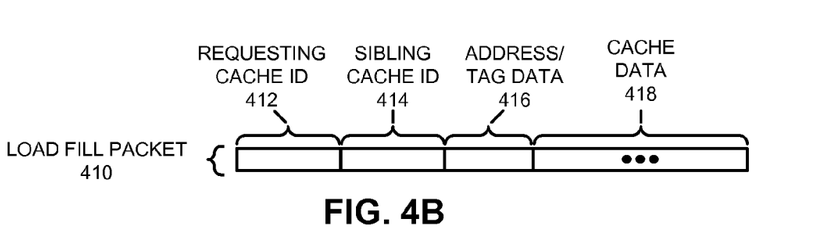
FIG. 4B illustrates an exemplary load fill packet sent by a lower-level cache to a requesting cache and a sibling cache in accordance with an embodiment.

FIG. 4B illustrates an exemplary load fill packet 410 sent by a lower-level cache to a requesting cache and a sibling cache. Load fill packet 410 includes fields for requesting cache ID 412 and sibling cache ID 414 in addition to address/tag data 416 and cache data 418 for the request. A cache receiving load fill packet 410 may check its own miss queue as well as requesting cache ID 412 and sibling cache ID 414 when deciding whether to load cache data 418 and update its tag information with address/tag data 416.

Note that, while the previous examples primarily describe two unshared L1 caches that share an L2 cache, the described techniques can be used to pre-fetch data into any unshared cache at any level in a multi-level cache hierarchy. For instance, the requesting thread and the sibling thread may access separate L1 caches and separate L2 caches, but share an underlying L3 cache. In such an architecture, sibling pre-fetch requests could be sent by the requesting thread down to the L3 cache to pre-fetch data into the sibling thread's L2 and L1 caches.

Figure 5:
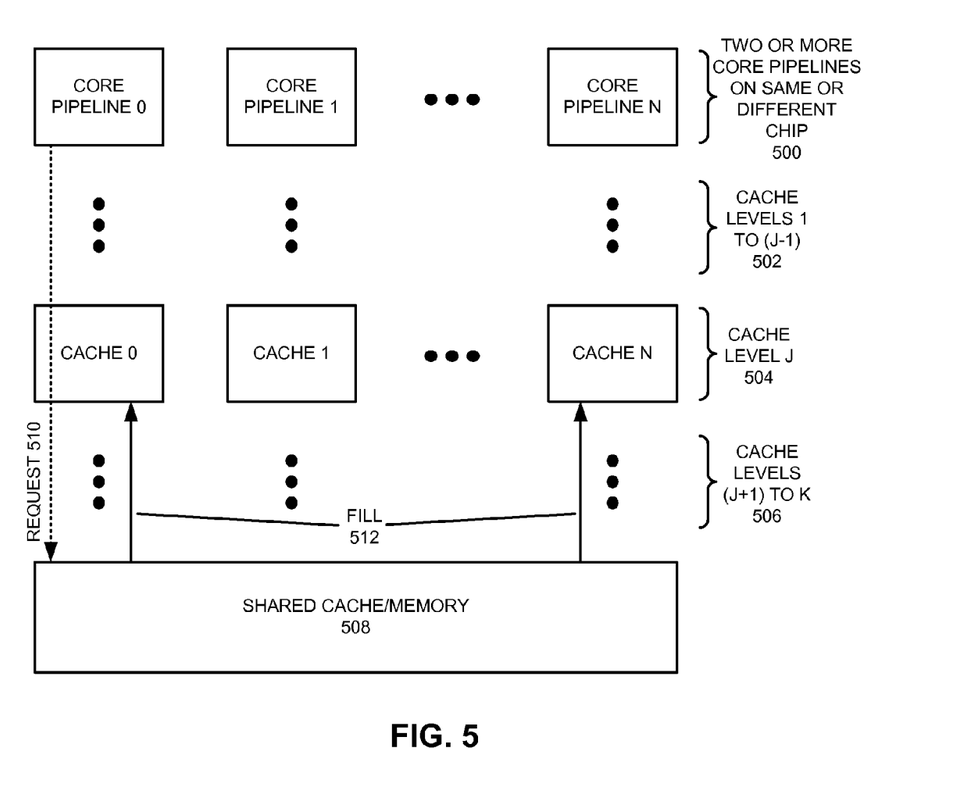
FIG. 5 illustrates how the disclosed techniques can be applied to pre-fetch data into any unshared sibling cache in a multi-level cache hierarchy in accordance with an embodiment.

FIG. 5 illustrates how the disclosed techniques can be applied to pre-fetch data into any unshared sibling cache in a multi-level cache hierarchy. In FIG. 5, two or more core pipelines on the same or different chips 500 receive data from K levels of unshared caches (502-506) that share an underlying cache or memory 508. Sibling pre-fetch operations can be used to pre-fetch data into any arbitrary level of the cache/memory hierarchy. For instance, a sibling pre-fetch request 510 initiated by core pipeline 0 may be received by shared cache/memory 508, which then sends a load fill 512 back to the requesting caches as well as to a sibling cache at cache level J 504.

Pre-Fetching into a Sibling TLB

In some embodiments, the scout thread and the sibling thread use separate TLBs to perform address translations, and substantially similar pre-fetching techniques can be applied to the hierarchy of TLBs so that translation misses do not need to be repeated for the sibling thread. For instance, when the scout thread accesses a memory address that results in a TLB miss (e.g., while executing a sibling pre-fetch instruction), the resulting translation fill information can also be pre-fetched into a TLB associated with the sibling thread.

Figure 6:
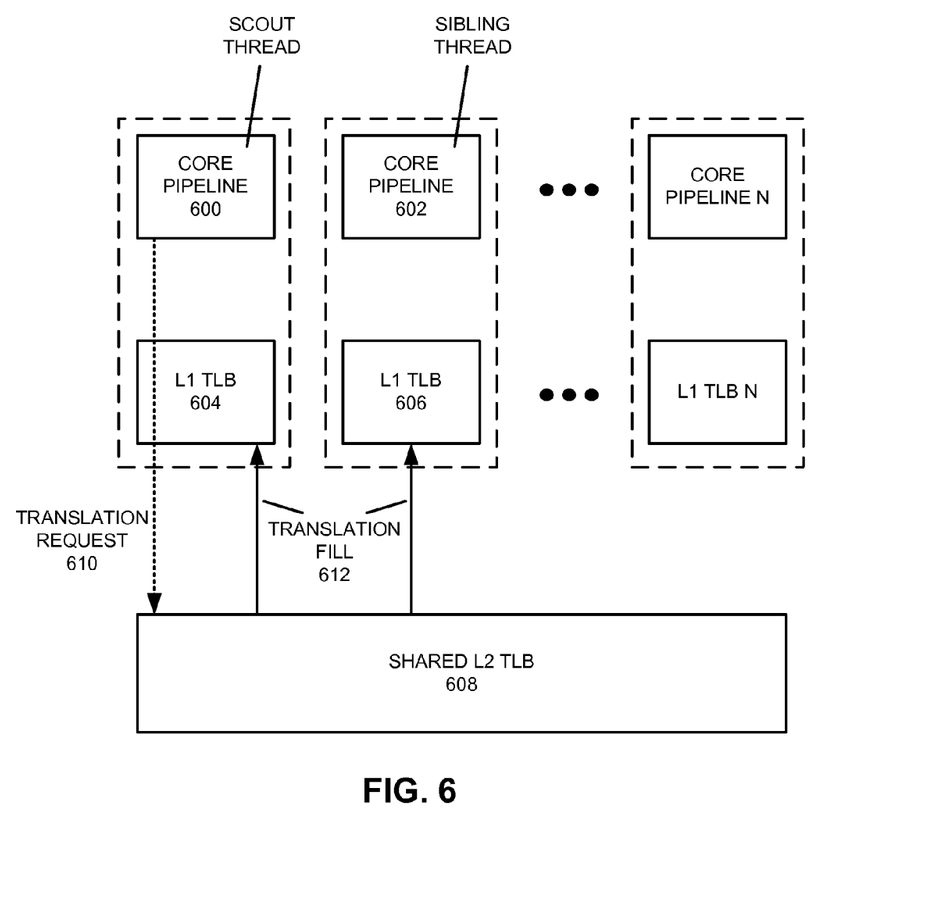
FIG. 6 illustrates how the disclosed pre-fetch techniques can be applied to address translations in accordance with an embodiment.

FIG. 6 illustrates how the disclosed pre-fetch techniques can also be applied to address translations. In FIG. 6, a scout thread for the sibling thread executes on core pipeline 600, and an associated sibling thread executes on core pipeline 602. The scout thread executes a sibling pre-fetch instruction in core pipeline 600, which attempts to translate the memory address being pre-fetched (in L1 TLB 604). If this translation misses, the translation request 610 is sent to a shared L2 TLB 608. Shared L2 TLB 608 then sends the resulting translation fill 612 to both L1 TLB 604 and L1 TLB 606, thereby potentially averting a translation miss for the sibling thread.

Note that the request to the shared L2 TLB 608 may include a special opcode that indicates that the translation fill should be sent to a sibling TLB and/or indicates the target sibling TLB. Note also that pre-fetching into a sibling TLB typically involves an L2 hardware TLB that can fill both higher-level TLBs. In some implementations an L2 TLB mechanism implemented in software may also support pre-fetching into a sibling TLB. However, such an implementation may need additional hardware infrastructure that allows a scout thread executing on one processor core to update the TLB of a second processor core executing the sibling thread without interfering with the sibling thread.

Determining a Destination Way in the Sibling Instruction Cache

In some situations, a wayward scout thread may become unsynchronized with a sibling thread. For instance, the scout thread may accidentally skip instructions that determine the direction of execution, and as a result being pre-fetching cache data that will not be used by the sibling thread (or will be flushed out of the sibling cache before it can be used by the sibling thread). Furthermore, in some situations a scout thread making a large number of sibling pre-fetches may push active data out of the sibling cache, thereby triggering an additional miss in the sibling cache, which has a negative impact on performance. Hence, a range of techniques may be used to determine and/or limit the locations in the sibling cache into which pre-fetched data will be loaded.

In some embodiments, data pre-fetched into a sibling cache is loaded based on the cache's standard replacement technique (e.g., a least-recently-used (LRU) cache replacement technique). For instance, if the sibling cache is a four-way set associative cache, the load fill can be loaded into any way available for the given tag/address. Such an arrangement involves little or no additional complexity, and does not limit performance gains from accurate, timely sibling pre-fetches.

In some embodiments, data pre-fetched into a multi-way set associative cache is always loaded into a specific, fixed way. For instance, for a four-way set associative sibling cache, one of the four ways may be dedicated to the scout thread, and all of the other ways are controlled based on the sibling thread's access patterns. Such an arrangement may limit the potential negative performance impacts of a wayward scout thread, but may also limit positive performance impacts in some situations.

Figure 7A:
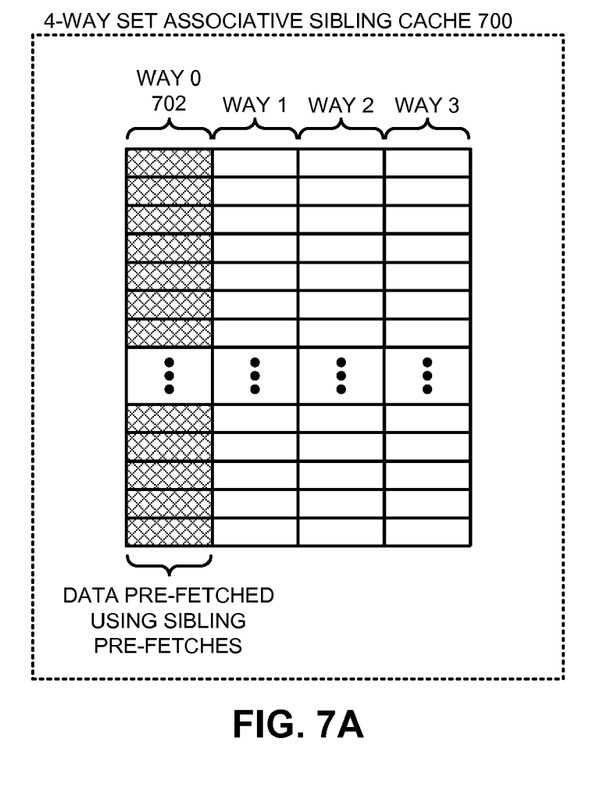
FIG. 7A illustrates a multi-way set associative cache in which sibling pre-fetches are limited to one way in accordance with an embodiment.

FIG. 7A illustrates a 4-way set associative sibling cache 700 in which one way 702 is reserved for data that is pre-fetched via sibling pre-fetches. Ways 1-3 remain reserved for the thread that primarily accesses the cache, and are used based on the cache's standard replacement technique.

In some embodiments, the set of possible destination ways in the sibling cache for pre-fetches can be selected based on an opcode included in the sibling pre-fetch instruction, fill request, and/or load fill. Alternatively, the set of target ways may also be controlled based on a value in a processor register. Such customized capabilities allow the possible destinations for pre-fetched load fills to be customized based on input from the application program, the cache system, and/or the compiler. Note that because cache architectures can change between processor implementations or architectures, such capabilities may involve additional tracking overhead. For instance, the processor may need to include a hardware register that specifies the number of ways available in a given cache, and sibling caches may need to track the number of ways for each cache row that have already been filled by sibling pre-fetches. Additional fields with an adequate number of bits may also need to be allocated in the sibling pre-fetch instruction, the fill request, and/or the load fill to identify the set of target ways.

Figure 7B:
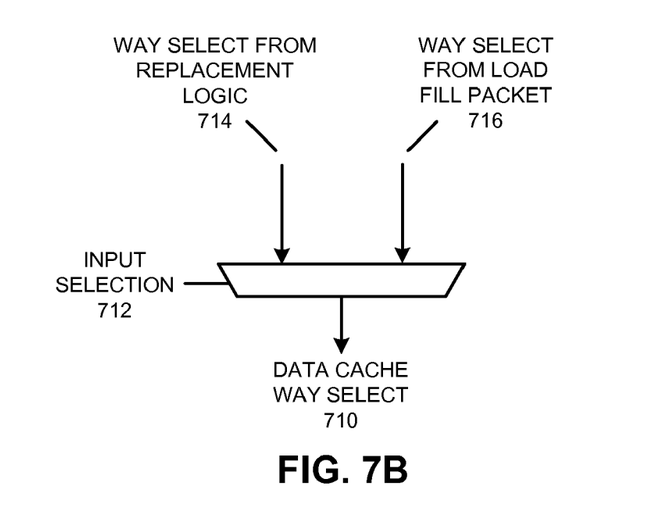
FIG. 7B illustrates a cache-way-selection mechanism for a multi-way set associative data cache which receives sibling pre-fetches in accordance with an embodiment.

FIG. 7B illustrates a cache-way-selection mechanism for a multi-way set associative data cache which receives sibling pre-fetched load fills. Based on input selection 712, data cache way select 710 can be set to either select the target way using the standard cache replacement logic 714 or to select the target way using way select information from a load fill packet 716.

In some embodiments, systems that load pre-fetched data into a specific way (or set of ways) may also include additional infrastructure for "promoting" sibling pre-fetched cache data to both keep pre-fetched data from saturating the sibling cache as well as to simplify the replacement of pre-fetched but unused cache data. For instance, consider a set of cache data pre-fetched into a fixed way (e.g., way 0) of the sibling cache. If the sibling thread begins using this piece of cache data, it might be undesirable for a subsequent load fill triggered by another sibling pre-fetch to push out the previously loaded (and now actively used) data line. In some embodiments, the compiler may track the set of addresses associated with sibling pre-fetch instructions to ensure that useful pre-fetched data is not overwritten by a subsequent pre-fetch. In alternative embodiments, the sibling cache may include one or more additional "s-bits" in each cache line that track whether an entry was sibling pre-fetched. The cache can set such an s-bit when receiving a sibling load fill, and then clear the s-bit if the sibling thread actually accesses the pre-fetched cache data. Thus, when a subsequent sibling pre-fetch requests a fill, if there is a cache entry in the target cache row that still has an s-bit set (e.g., was pre-fetched but not used), then that cache entry is selected for replacement. Otherwise, the cache uses a standard cache replacement technique to pick a victim. Such a mechanism ensures that at most one (or a chosen number) of ways are "wasted" in situations where the sibling pre-fetch data is erroneous or otherwise unused.

In summary, embodiments of the present invention involve techniques that allow a scout thread to pre-fetch data into a cache which is not accessed by the scout thread. The ability to pre-fetch into an unshared cache provides a sibling thread using the cache with the benefits of a dedicated cache while maintaining the performance gains enabled by such pre-fetching, thereby improving overall performance for the sibling thread. The described techniques can be applied to a wide range of processor structures, including data caches, instruction caches, and TLBs.

Computing Environment

In some embodiments of the present invention, a processor that facilitates pre-fetching into a sibling cache can be incorporated into a wide range of computing devices in a computing environment.

Figure 8:
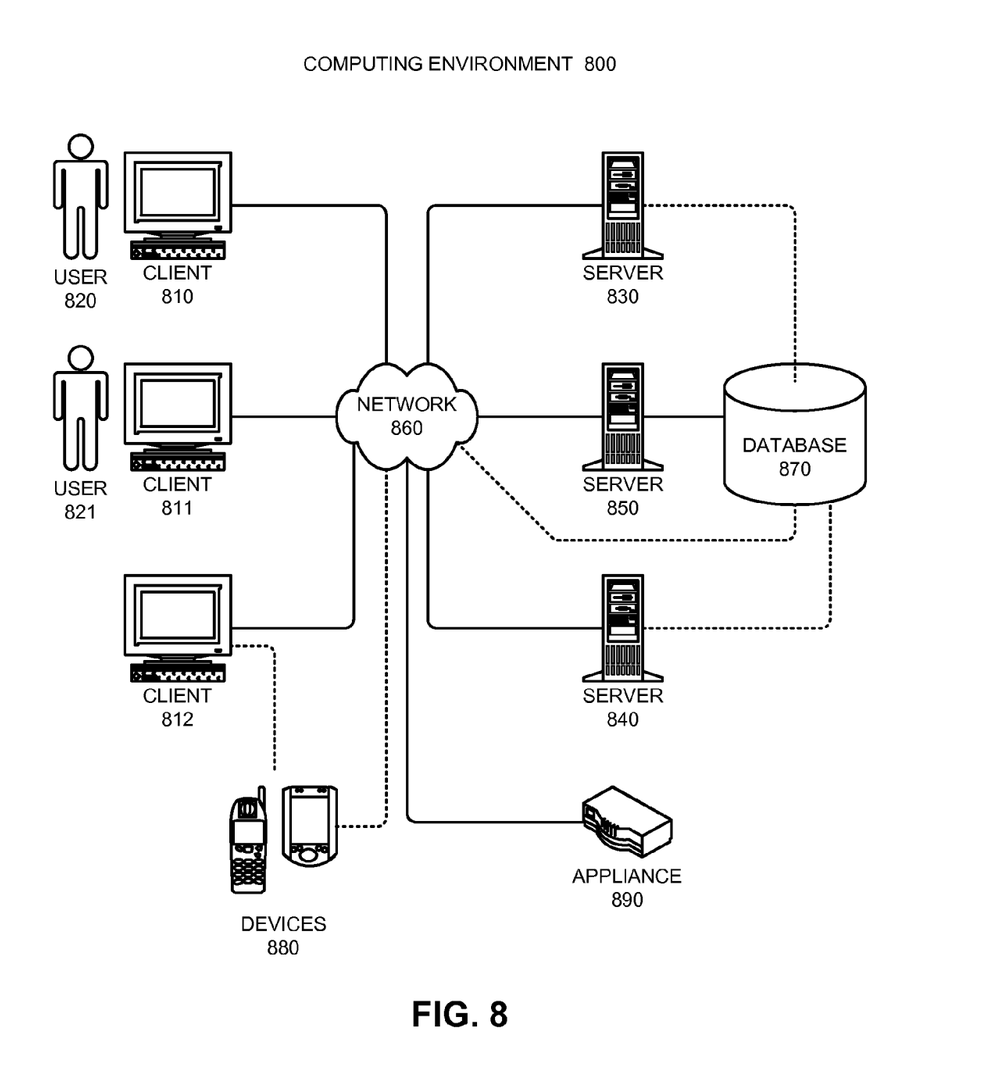
FIG. 8 illustrates a computing environment in accordance with an embodiment.

FIG. 8 illustrates a computing environment 800 in accordance with an embodiment of the present invention. Computing environment 800 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 8, computing environment 800 includes clients 810-812, users 820 and 821, servers 830-850, network 860, database 870, devices 880, and appliance 890.

Clients 810-812 can include any node on a network that includes computational capability and includes a mechanism for communicating across the network. Additionally, clients 810-812 may comprise a tier in an n-tier application architecture, wherein clients 810-812 perform as servers (servicing requests from lower tiers or users), and wherein clients 810-812 perform as clients (forwarding the requests to a higher tier).

Similarly, servers 830-850 can generally include any node on a network including a mechanism for servicing requests from a client for computational and/or data storage resources. Servers 830-850 can participate in an advanced computing cluster, or can act as stand-alone servers. In one embodiment of the present invention, server 840 is an online "hot spare" of server 850.

Users 820 and 821 can include: an individual; a group of individuals; an organization; a group of organizations; a computing system; a group of computing systems; or any other entity that can interact with computing environment 800.

Network 860 can include any type of wired or wireless communication channel capable of coupling together computing nodes. This includes, but is not limited to, a local area network, a wide area network, or a combination of networks. In one embodiment of the present invention, network 860 includes the Internet. In some embodiments of the present invention, network 860 includes phone and cellular phone networks.

Database 870 can include any type of system for storing data in non-volatile storage. This includes, but is not limited to, systems based upon magnetic, optical, or magneto-optical storage devices, as well as storage devices based on flash memory and/or battery-backed up memory. Note that database 870 can be coupled: to a server (such as server 850), to a client, or directly to a network. In some embodiments of the present invention, database 870 is used to store information related to virtual machines and/or guest programs. Alternatively, other entities in computing environment 800 may also store such data (e.g., servers 830-850).

Devices 880 can include any type of electronic device that can be coupled to a client, such as client 812. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention devices 880 can be coupled directly to network 860 and can function in the same manner as clients 810-812.

Appliance 890 can include any type of appliance that can be coupled to network 860. This includes, but is not limited to, routers, switches, load balancers, network accelerators, and specialty processors. Appliance 890 may act as a gateway, a proxy, or a translator between server 840 and network 860.

Note that different embodiments of the present invention may use different system configurations, and are not limited to the system configuration illustrated in computing environment 800. In general, any device that is capable of supporting software scouting in multiple processor cores with separate caches may incorporate elements of the present invention.

Previously described FIG. 1 illustrates a computing device 100 that includes a processor 101 that supports pre-fetching into a sibling cache. In some embodiments of the present invention, some or all aspects of processor cores 102, core pipelines 104, L1 TLBs 106, L1 caches 108, shared L2 TLB 110, and/or shared L2 cache 112 can be implemented as dedicated hardware modules in processor 101. For example, processor 101 can include one or more specialized circuits for performing the operations of the mechanisms. Alternatively, some or all of the operations of processor cores 102, core pipelines 104, L1 TLBs 106, L1 caches 108, shared L2 TLB 110, and/or shared L2 cache 112 may be performed using general-purpose circuits in processor 101 that are configured using processor instructions.

Although FIG. 1 illustrates processor cores 102, core pipelines 104, L1 TLBs 106, L1 caches 108, shared L2 TLB 110, and/or shared L2 cache 112 as being included in processor 101, in alternative embodiments some or all of these mechanisms are external to processor 101. For instance, these mechanisms may be incorporated into hardware modules external to processor 101. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for pre-fetching for a sibling cache, comprising:
   executing a first thread in a first processor core associated with a first cache;
   executing a second thread associated with the first thread in a second processor core associated with a second cache;
   executing an instruction in the second thread that triggers a request to a lower-level cache which is shared by the first cache and the second cache; and
   directing a load fill which returns from the lower-level cache in response to the request to the first cache;
   wherein the second thread executes program instructions that pre-fetch into the first cache, thereby reducing cache misses for the first thread.

2. The method of claim 1,
   wherein the second thread is a scout thread for the first thread; and
   wherein the first thread and the scout thread both execute program instructions from the same program, but the scout thread speculatively executes ahead of the first thread to pre-fetch into the first cache.

3. The method of claim 1,
   wherein the instruction is a sibling pre-fetch instruction; and
   wherein the request specifies that the resulting load fill should be directed to both the first cache and the second cache.

4. The method of claim 3, wherein the sibling pre-fetch instruction includes one or more fields that specify that the load fill should be directed to both the first cache and the second cache.

5. The method of claim 4, wherein the request is sent to the lower-level cache only when data associated with a memory address specified by the sibling pre-fetch instruction is not available in the second cache.

6. The method of claim 4, wherein the request is sent to the lower-level cache regardless of whether data associated with a memory address specified by the sibling pre-fetch instruction is available in the second cache.

7. The method of claim 4, wherein the method further comprises inserting the sibling pre-fetch instruction into the program instructions for the second thread during compilation.

8. The method of claim 1, wherein directing the load fill further comprises one or more of the following:
   determining that the request for the load fill originated from the second processor core;
   directing the load fill to the second cache; and
   determining from a field in the load fill that the request was triggered by the second thread on behalf of the first thread and that the load fill is also targeted to the first cache.

9. The method of claim 1,
   wherein the first cache is a multi-way set associative cache; and
   wherein directing the load fill to the first cache further comprises loading a cache line into a pre-specified way of the first cache.

10. The method of claim 1,
    wherein the first cache is a multi-way set associative cache; and
    wherein directing the load fill to the first cache further comprises determining a cache row and a cache way for the load fill using a standard cache replacement technique.

11. The method of claim 1,
    wherein the first processor core is associated with a first translation lookaside buffer (TLB) and the second processor core is associated with a second TLB;
    wherein the first TLB and the second TLB share a lower-level TLB; and
    wherein executing the instruction further comprises:
      determining that the second TLB does not have a mapping for a memory address associated with the instruction;
      triggering a TLB request to the lower-level TLB; and
      directing a TLB load fill associated with the TLB request to the first TLB, thereby reducing TLB misses for the first thread.

12. A processor that facilitates pre-fetching for a sibling cache, comprising:
    a first processor core;
    a second processor core;
    a first cache associated with the first processor core;
    a second cache associated with the second processor core; and
    a lower-level cache which is shared by the first cache and the second cache;
    wherein a first thread executes in the first processor core and a second thread associated with the first thread executes in the second processor core;
    wherein an instruction executed by the second thread triggers a request to the lower-level cache; and
    wherein the lower-level cache is configured to direct a load fill which returns from the lower-level cache in response to the request to the first cache, thereby reducing cache misses for the first thread.

13. The processor of claim 12,
    wherein the second thread is a scout thread for the first thread; and
    wherein the first thread and the scout thread both execute program instructions from the same program, but the scout thread speculatively executes ahead of the first thread to pre-fetch into the first cache.

14. The processor of claim 12,
    wherein the instruction is a sibling pre-fetch instruction; and
    wherein the request specifies that the resulting load fill should be directed to both the first cache and the second cache.

15. The processor of claim 14, wherein the sibling pre-fetch instruction includes one or more fields that specify that the load fill should be directed to both the first cache and the second cache.

16. The processor of claim 15, wherein the request is sent to the lower-level cache only when data associated with a memory address specified by the sibling pre-fetch instruction is not available in the second cache.

17. The processor of claim 15, wherein the request is sent to the lower-level cache regardless of whether data associated with a memory address specified by the sibling pre-fetch instruction is available in the second cache.

18. The processor of claim 12, wherein the lower-level cache is further configured to:
   determine that the request for the load fill originated from the second processor core;
   direct the load fill to the second cache; and
   determine from a field in the load fill that the request was triggered by the second thread on behalf of the first thread and that the load fill is also targeted to the first cache.

19. The processor of claim 12,
   wherein the first cache is a multi-way set associative cache; and
   wherein the first cache is configured to load the load fill into a pre-specified way of the first cache.

20. The processor of claim 12, wherein the processor further comprises:
   a first translation lookaside buffer (TLB) that is associated with the first processor core;
   a second TLB that is associated with the second processor core; and
   a lower-level TLB that is shared by the first TLB and the second TLB;
   wherein the instruction executed by the second thread accesses a memory address that is not mapped in the second TLB, thereby triggering a TLB miss in the second TLB;
   wherein the second TLB is configured to trigger a TLB request to the lower-level TLB upon a miss; and
   wherein the lower-level TLB is configured to direct a TLB load fill associated with the TLB request to the first TLB, thereby reducing TLB misses for the first thread.

* * * * *